United States Patent
Fricke et al.

(10) Patent No.: US 10,550,904 B2
(45) Date of Patent: Feb. 4, 2020

(54) DISC BRAKE FOR A COMMERCIAL VEHICLE

(71) Applicant: KNORR-BREMSE Systeme fuer Nutzfahrzeuge GmbH, Munich (DE)

(72) Inventors: Jens Fricke, Vilshofen (DE); Tobias Schoefberger, Mainburg (DE); Philipp Adamczyk, Stoettwang (DE); Michael Peschel, Schoengeising (DE); Peter Schmidt, Bad Toelz (DE); Kai Rieck, Gersthofen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/841,440

(22) Filed: Dec. 14, 2017

(65) Prior Publication Data

US 2018/0106317 A1 Apr. 19, 2018

Related U.S. Application Data

(63) Continuation of application No. PCT/EP2016/000910, filed on Jun. 2, 2016.

(30) Foreign Application Priority Data

Jun. 15, 2015 (DE) .................. 10 2015 109 541

(51) Int. Cl.
*F16D 65/54* (2006.01)
*F16D 55/226* (2006.01)
*F16D 65/097* (2006.01)

(52) U.S. Cl.
CPC ........... *F16D 65/54* (2013.01); *F16D 55/226* (2013.01); *F16D 65/0973* (2013.01)

(58) Field of Classification Search
CPC .... F16D 65/54; F16D 65/0973; F16D 55/226; F16D 2127/02; F16D 2055/0029
See application file for complete search history.

(56) References Cited

U.S. PATENT DOCUMENTS

| 4,345,674 A | 8/1982 | Vacval |
| 4,741,419 A | 5/1988 | Rath |

(Continued)

FOREIGN PATENT DOCUMENTS

| CN | 100385134 C | 4/2008 |
| CN | 104271978 A | 1/2015 |

(Continued)

OTHER PUBLICATIONS

International Search Report (PCT/ISA/210) issued in PCT Application No. PCT/EP2016/000910 dated Sep. 13, 2016 with English translation (five pages).

(Continued)

*Primary Examiner* — Xuan Lan Nguyen
(74) *Attorney, Agent, or Firm* — Crowell & Moring LLP

(57) ABSTRACT

A disc brake for a commercial vehicle has a brake caliper, which straddles a brake disc and is designed as a sliding caliper and is fastened to a stationary brake carrier, two brake pads, which are arranged in the brake caliper and can be moved in opposite directions and which each have a backing plate and a friction lining fastened to the backing plate, of which brake pads an action-side brake pad can be pressed against the brake disc by an application device via a brake piston, and at least one restoring device, by which the brake caliper can be restored after a braking-related displacement and release of the brake. The disc brake is designed such that the restoring device has at least two rods, which lie against the brake pads with spring loading against the respective application directions of the brake pads, of (Continued)

which rods one is designed as a pulling rod and the other is designed as a pushing rod.

20 Claims, 2 Drawing Sheets

(56) References Cited

U.S. PATENT DOCUMENTS

| | | | |
|---|---|---|---|
| 9,382,957 | B2 | 7/2016 | Asen et al. |
| 9,599,176 | B2 | 3/2017 | Baumgartner et al. |
| 2007/0107997 | A1 | 5/2007 | Eiband |
| 2010/0000828 | A1 | 1/2010 | Pericevic et al. |

FOREIGN PATENT DOCUMENTS

| | | |
|---|---|---|
| CN | 204099467 U | 1/2015 |
| DE | 28 31 643 A1 | 1/1980 |
| DE | 86 11 037 U1 | 8/1987 |
| DE | 103 30 306 A1 | 1/2005 |
| DE | 10 2007 001 213 A1 | 7/2008 |
| DE | 10 2012 006 111 A1 | 9/2013 |
| DE | 10 2012 102 584 A1 | 9/2013 |
| DE | 10 2013 016 779 A1 | 4/2015 |
| GB | 2 097 876 A | 11/1982 |
| JP | 8-226472 A | 9/1996 |
| JP | 11-344058 A | 12/1999 |
| JP | 2012-202528 A | 10/2012 |

OTHER PUBLICATIONS

German-language Written Opinion (PCT/ISA/237) issued in PCT Application No. PCT/EP2016/000910 dated Sep. 13, 2016 (five pages).
German-language Office Action issued in counterpart German Application No. 10 2015 109 541.6 dated Feb. 26, 2016 (six pages).
International Preliminary Report on Patentability (PCT/IB/373) issued in PCT Application No. PCT/EP2016/000910 dated Dec. 19, 2017, including English translation of document C2 (German-language Written Opinion (PCT/ISA/237)) previously filed on Dec. 14, 2017 (5 pages).
Chinese-language Office Action issued in counterpart Chinese Application No. 201680034948.6 dated Nov. 20, 2018 with partial English translation (seven (7) pages).
Japanese Office Action issued in Japanese counterpart application No. 2017-564439 dated Jan. 30, 2019, with English translation (Eleven (11) pages).

DISC BRAKE FOR A COMMERCIAL VEHICLE

CROSS REFERENCE TO RELATED APPLICATIONS

This application is a continuation of PCT International Application No. PCT/EP2016/000910, filed Jun. 2, 2016, which claims priority under 35 U.S.C. § 119 from German Patent Application No. 10 2015 109 541.6, filed Jun. 15, 2015, the entire disclosures of which are herein expressly incorporated by reference.

BACKGROUND AND SUMMARY OF THE INVENTION

The invention relates to a disc brake for a commercial vehicle having a brake caliper which straddles a brake disc, is configured as a sliding caliper, and is fastened to a stationary brake carrier. Two brake pads are arranged in the brake caliper and can be moved in opposite directions. Each brake pad has a lining carrier plate and a friction lining fastened thereon. The one brake pad on the action side can be pressed against the brake disc by way of a brake application device via at least one brake plunger.

In the case of a disc brake of the generic type, which is also known as a sliding caliper brake, an action-side brake pad is pressed against a vehicle-side brake disc in the case of a braking operation by way of a brake application device which can be actuated pneumatically or by electric motor. During the further course of the braking operation, the brake caliper is displaced, in relation to the brake disc, counter to the brake application direction of the action-side brake pad, with driving and pressing of the opposite, reaction-side brake pad onto the other side of the brake disc.

After the release of the brake, the brake caliper remains in said position in the case of the known disc brake, in which position, although the brake pads, or at least the reaction-side brake pad, bear without pressure, they bear in a rubbing manner against the brake disc. The residual rubbing moments of the brake pads which occur as a result during driving operation have a disadvantageous effect, insofar as they lead to an increased fuel consumption and to a reduction in the service life of the components involved, namely the brake disc and the brake pads.

Although a slight release of the brake pads takes place during driving operation, for example by way of tumbling of the brake disc and by way of vibrations and lateral accelerations when driving around bends, said effects are not sufficient to effectively prevent the abovementioned residual rubbing moments.

In order to counteract this problem, DE 10 2007 001 213 (which forms the generic type) discloses a disc brake having a restoring device which is arranged in one of the guide rods, via which the brake caliper is held displaceably on the brake carrier. The restoring device has a sprung restoring element, by way of which the brake caliper is displaced into a starting position.

This construction has proven itself in principle. The use of the known restoring device in the case of compressed air actuated disc brakes of heavy commercial vehicles can lead to problems, however, since broad limits of variable influences as a result of component tolerances and component deformations are in effect here, which broad limits do not permit a reliable function of the restoring device in every case.

Comparable problems result in the case of a disc brake as discussed in DE 10 2012 006 111 A1. Here, a restoring device is arranged on the side which lies opposite the brake application device and faces the reaction-side brake pad, as a result of which effective, in particular automatic restoring of the brake caliper is achieved, with the smallest possible infringement of the system rigidity at the same time.

In every case, the restoring device acts on the brake caliper, the brake carrier acting as a thrust bearing.

The invention is based on the object of developing a disc brake of the generic type in such a way that the service life, in particular, of the brake pads and the brake disc is increased and the operating costs overall are lowered by way of structurally very simple means.

This and other objects of the invention are achieved by way of a disc brake having a brake caliper which straddles a brake disc, is configured as a sliding caliper, and is fastened to a stationary brake carrier. Two brake pads are arranged in the brake caliper and can be moved in opposite directions. Each brake pad has a lining carrier plate and a friction lining fastened thereon. The one brake pad on the action side can be pressed against the brake disc by way of a brake application device via at least one brake plunger. At least one restoring device, by way of which the brake caliper can be restored after a braking-induced displacement and release of the brake, has at least two rods which bear against the brake pads in a spring-loaded manner counter to the respective brake application direction of the brake pads. One rod is configured as a pull rod and the other rod is configured as a push rod.

Restoring of both brake pads in the case of a released brake is achieved by way of the embodiment according to the invention of the disc brake. Here, the restoring force acts counter to the respective brake application direction of the two brake pads, that is to say toward the caliper back in the case of the reaction-side brake pad and toward the caliper top in the case of the actionside brake pad, with the formation of gaps with respect to the brake disc.

The action of the rods of the restoring device according to the invention on the two brake pads expediently takes place on their lining carrier plates, to be precise on the side which faces the friction lining which is fastened thereto.

In order to avoid tilting of the respective brake pad during the restoring, rods act on the brake pads, that is to say on their lining carrier plates, in each case in pairs, on the right-hand side and on the left-hand side in relation to the rotational axis of the brake disc.

The rods consist of a dimensionally stable material, preferably metal, and are of rod-shaped configuration, with a largely continuous cross-sectional dimension; largely continuous insofar as a small cuff is integrally formed on each rod, which small cuff serves as a driver in the case of the pull rod and as a stop in the case of the push rod.

The driver of the pull rod is integrally formed at its one end and bears against the action-side lining carrier plate on the side which faces the friction lining.

In contrast, the stop of the push rod corresponds with an associated spring and serves to displace the push rod in the case of relieving of the spring when the brake pads are pushed back into their starting positions in the case of a released brake.

According to one advantageous development of the invention, a rod pair, that is to say a pull rod and a push rod, are held in a housing which is arranged on or in the brake caliper, which housing can be set with respect to a vehicle-side brake carrier, on which the brake caliper is mounted axially displaceably as a sliding caliper, likewise in relation to the rotational axis of the brake disc.

It is also contemplated to assign a plurality of rods to in each case one of the springs, that is to say a plurality of pull and/or push rods.

In order to optimize the costs of the manufacture of the restoring device, identical springs are provided for the rods, for example as compression springs, in particular helical springs, with identical spring properties. The helical springs are guided on the rods, it also being possible, in particular, for the pull rod to be connected to a tension spring.

A point of action between the push rod or the pull rod and the brake pad advantageously lies in the vicinity of the resistance force which results from a supporting force between the respective brake pad and the brake carrier.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
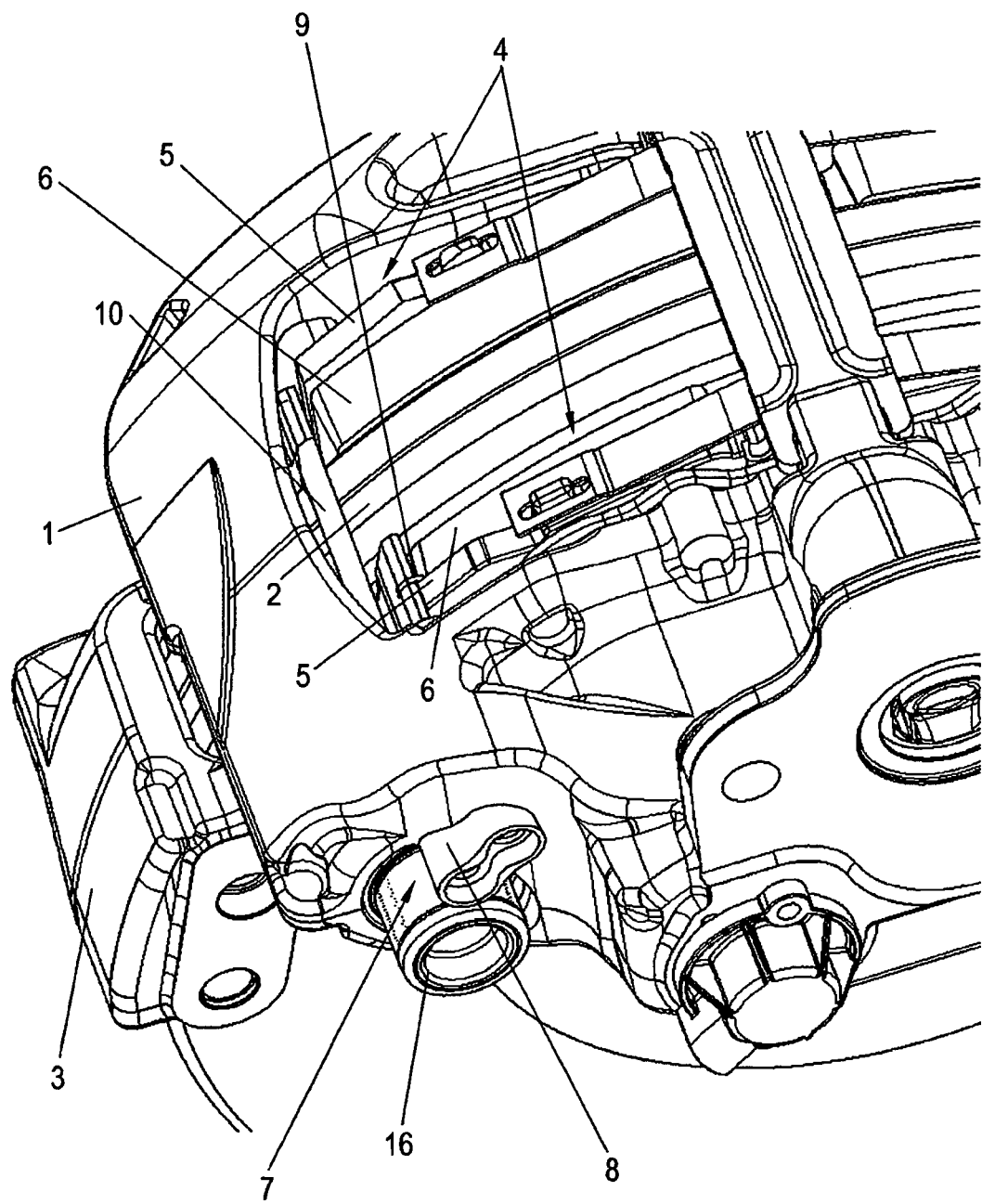
FIG. 1 shows a disc brake which is provided with an exemplary restoring device according to the invention, in a part detail in a perspective view.

FIG. 1 shows a part of a disc brake for a commercial vehicle, having a brake caliper 1 which straddles a brake disc 2 and is connected on a vehicle-side, that is to say stationary brake carrier 3, in an axially displaceable manner in relation to the rotational axis of the brake disc 2. For the axial displacement, the brake caliper 1 is mounted on guide rods 16 which are connected to the brake carrier 3.

Brake pads 4 are arranged in the brake carrier 3, which brake pads 4 can be pressed on both sides onto the brake disc 2 in the case of a braking operation. Here, each brake pad 4 has a lining carrier plate 5 and a friction lining 6 which is fastened thereto on the side which faces the brake disc 2. The friction lining 6 is pressed against the brake disc 2 during functioning, that is to say in the case of a braking operation.

The braking takes place by means of a brake application device (not shown) which is arranged in the brake caliper 1 and has a brake lever which is mounted such that it can be pivoted pneumatically or electromechanically, wherein the associated brake pad 4 makes contact as the action-side brake pad with the brake disc 2 in the case of the actuation of said brake lever. In the further course, the brake caliper 1 axially is displaced in the opposite direction by means of reaction forces which occur, with the driving of the reaction-side brake pad 4 until it likewise comes into frictional contact with the brake disc 2.

After the brake is released, the two brake pads 4 which lie opposite one another are released from the brake disc 2 by way of a restoring device 7 to such an extent that the brake disc 2 runs freely with respect to the brake pads 4.

Figure 2:
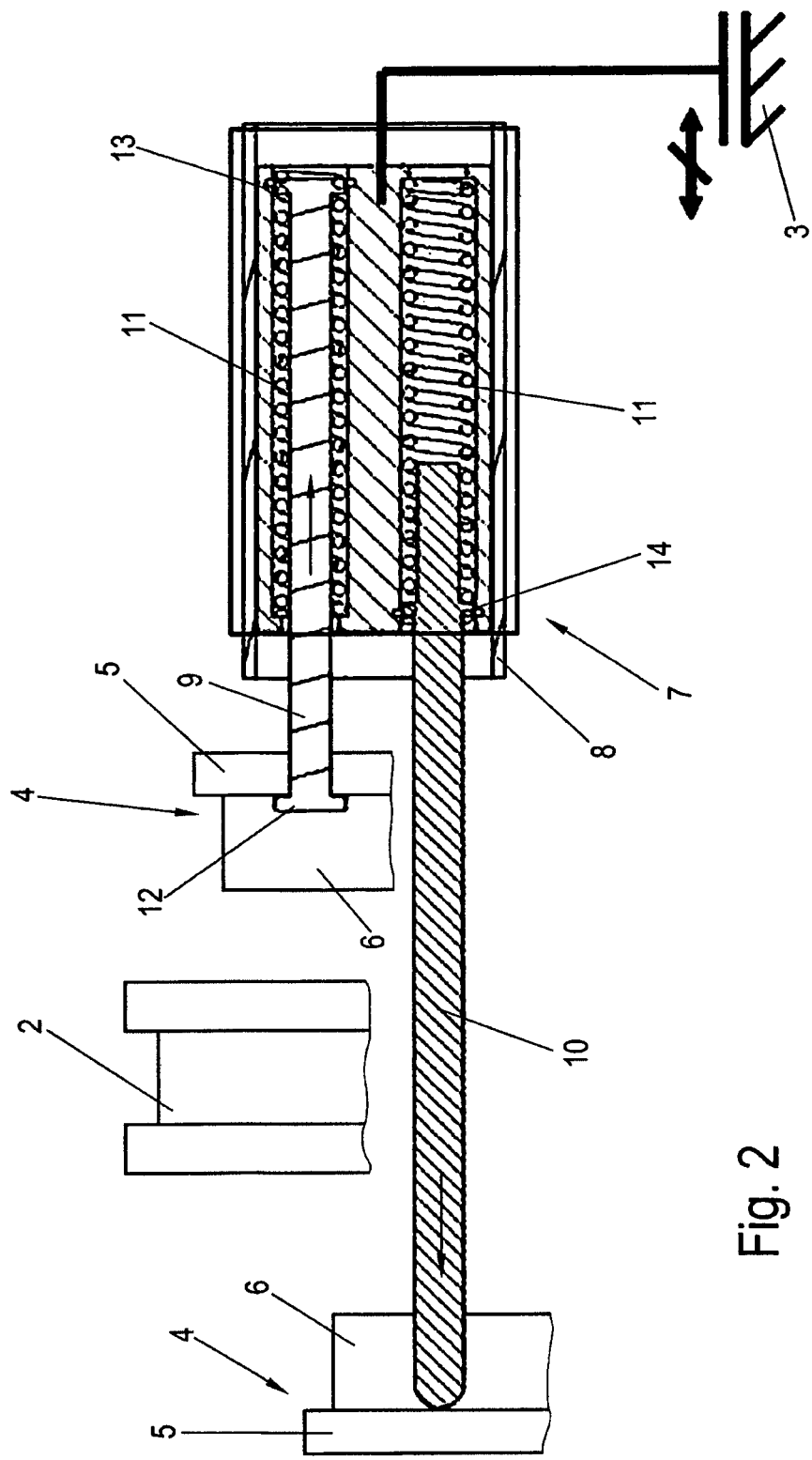
FIG. 2 shows a detail of the disc brake in a diagrammatic, sectioned side view.

FIG. 2 shows the restoring device 7 as a detail in a diagrammatic view. Here, according to the invention, the restoring device 7 has two rods which bear against the brake pads 4 in a manner which is spring-loaded counter to the respective brake application direction. Of the two rods, one is configured as a push rod 10 and the other is configured as a pull rod 9.

As, in particular, FIG. 1 shows very clearly, the push rod 10 bears with its free end against the edge of the lining carrier plate 5 of the reaction-side brake pad 4, whereas the pull rod 9 bears against the lining carrier plate 5 of the action-side brake pad 4. In both cases, the rods bear against those sides of the lining carrier plates 5 which face the friction linings 6.

In each case one compression spring 11, which is configured as a helical spring, is provided for spring loading the pull rod 9 and the push rod 10, which compression springs 11 are of identical configuration in the example and extend around the pull rod 9 and the push rod 10 in regions. The respective functional units are mounted in a housing 8 which is inserted into a receptacle of the brake caliper 1.

At one end, the pull rod 9 has a driver 12 in the form of a small cuff, which driver 12 bears against the action-side lining carrier plate 5. A driver ring 13 is fastened to the other end of the pull rod 9, by means of which driver ring 13 the compression spring 11 is stressed in the case of a corresponding axial displacement of the pull rod 9. The compression spring 11 is supported with its other end side on an inner wall of the housing 8.

The push rod 10 is provided with a circumferential stop 14 which bears against an end side of the associated compression spring 11, whereas the other end side of the compression spring 11 is supported on the bottom of the housing 8.

FIG. 2 shows a starting position, that is to say a released position of the disc brake, in which the compression springs 11 are substantially relieved. In the case of a braking operation, the brake pads 4 are displaced in a manner directed toward one another as far as frictional contact with the brake disc 2. Here, the compression spring 11 which is guided on the pull rod 9 is stressed, the driver ring 13 being in engagement to this end. The compression spring 11 which is guided on the push rod 10 is likewise stressed by way of compression, the spring forces which are to be overcome being applied easily by way of the brake application force.

In the case of a release of the brake, the pull rod 9 and the push rod 10 are moved axially by way of the force of the compression springs 11; to be precise, the pull rod 9 is moved with driving, that is to say withdrawing of the action-side brake pad 4, whereas the reaction-side brake pad 4 (can be seen on the left-hand side in FIG. 2) is pressed out of the region of action with the brake disc 2 by way of the push rod 10, in accordance with the arrows in FIG. 2.

In the further course, the brake caliper 1 is displaced into a starting position by way of the push rod 10 which bears against it and is still under spring pressure.

LIST OF DESIGNATIONS

1 Brake caliper
2 Brake disc
3 Brake carrier
4 Brake pad
5 Lining carrier plate
6 Friction lining
7 Restoring device
8 Housing
9 Pull rod
10 Push rod
11 Compression spring
12 Driver
13 Driver ring
14 Stop
16 Guide rod The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake using brake pads applied to a brake disc, the disc brake comprising:
   a brake caliper which, in use, straddles the brake disc;
   a stationary brake carrier relative to which the brake caliper is axially displaceable as a sliding caliper, wherein the brake pads are arrangeable in the brake caliper and are movable in opposite directions, each brake pad having a lining carrier plate and a friction lining fastened thereon;
   guide rods, wherein the brake caliper is mounted axially displaceable on the guide rods and wherein the guide rods are connected to the stationary brake carrier; and
   a restoring device by way of which the brake caliper is restored after a braking induced displacement and release of the disc brake, wherein
      the restoring device comprises at least two rods configured to bear against the brake pads in a spring-loaded manner counter to a respective brake application direction of the brake pads, and
      one rod is configured as a pull rod and the other rod is configured as a push rod.

2. The disc brake as claimed in claim 1, wherein the pull rod and the push rod bear against the lining carrier plate of the respective brake pad.

3. The disc brake as claimed in claim 1, wherein the pull rod is held on the lining carrier plate of an action-side brake pad, whereas the push rod is supported on the lining carrier plate of the reaction-side brake pad.

4. The disc brake as claimed in claim 1, wherein the pull rod and the push rod bear against those sides of the lining carrier plates which face the respective friction linings of the brake pads.

5. The disc brake as claimed in claim 1, wherein in order to spring load the pull and push rods, they are operatively connected in each case to a tension or compression spring.

6. The disc brake as claimed in claim 5, wherein the tension or compression springs are configured as helical springs and are guided in regions on the pull rod and the push rod.

7. The disc brake as claimed in claim 5, wherein a functional unit comprising the pull rod and its associated tension or compression spring and the push rod and its associated tension or compression spring is mounted in a housing.

8. The disc brake as claimed in claim 7, wherein the housing is positioned in the brake caliper.

9. The disc brake as claimed in claim 5, wherein the tension or compression springs are identical.

10. The disc brake as claimed in claim 1, wherein the pull rod and the push rod run in an axially parallel manner with respect to one another.

11. The disc brake as claimed in claim 5, wherein the pull rod has a driver at one end, which driver bears against the lining carrier plate.

12. The disc brake as claimed in claim 11, wherein the pull rod has a driver ring on the end side which faces away from the driver, against which driver ring the compression spring bears.

13. The disc brake as claimed in claim 12, wherein the push rod has a stop which is circumferential at least in regions and against which the compression spring bears with one end, whereas the other end of the compression spring is supported on the bottom of the housing.

14. A restoring device by which a sliding caliper of a disc brake is restored after a braking-induced displacement and release of the disc brake and its associated brake pads, wherein the sliding caliper is mounted on guide rods which are connected to a brake carrier of the disc brake, the restoring device comprising:
   a first rod configured to bear against a first brake pad in a spring-loaded manner counter to a respective brake application direction of the first brake pad;
   a second rod configured to bear against a second brake pad in a spring-loaded manner counter to a respective brake application direction of the second brake pad, wherein
      one rod is configured as a pull rod and the other rod is configured as a push rod.

15. The restoring device as claimed in claim 14, wherein the pull rod and the push rod each bear against a respective lining carrier plate of the respective brake pad.

16. The restoring device as claimed in claim 15, wherein the pull rod and the push rod bear against those sides of the lining carrier plates that face respective friction linings of the brake pads.

17. The restoring device as claimed in claim 14, wherein in order to spring load the pull and push rods, the pull and push rods are operatively coupled in each case to a respective tension or compression spring.

18. The restoring device as claimed in claim 17, further comprising:
   a housing in which is mounted a functional unit comprising the pull rod and its associated tension or compression spring and the push rod and its associated tension or compression spring.

19. The restoring device as claimed in claim 17, wherein the pull rod has a driver at one end, which driver bears against a lining carrier plate of the respective brake pad, and a driver ring on an end side facing away from the driver, against which driver ring the compression spring bears.

20. The restoring device as claimed in claim 19, wherein the push rod has a stop which is circumferential at least in sections and against which the compression spring bears with one end, whereas the other end of the compression spring is supported on a bottom of the housing.

* * * * *